US010260312B2

(12) United States Patent
Mathiesen et al.

(10) Patent No.: US 10,260,312 B2
(45) Date of Patent: Apr. 16, 2019

(54) FLOW CONTROL DEVICE

(71) Applicant: Inflow Control AS, Porsgrunn (NO)

(72) Inventors: Vidar Mathiesen, Porsgrunn (NO);
Bjornar Werswick, Langesund (NO);
Haavard Aakre, Skien (NO)

(73) Assignee: InflowControl AS, Porsgrunn (NO)

( * ) Notice: Subject to any disclaimer, the term of this patent is extended or adjusted under 35 U.S.C. 154(b) by 0 days.

(21) Appl. No.: 15/587,419

(22) Filed: May 5, 2017

(65) Prior Publication Data

US 2017/0234106 A1   Aug. 17, 2017

Related U.S. Application Data

(63) Continuation of application No. 14/386,459, filed as application No. PCT/EP2013/054485 on Mar. 6, 2013, now Pat. No. 9,683,429.

(Continued)

(30) Foreign Application Priority Data

Mar. 21, 2012   (NO) .................................. 20120334
Aug. 6, 2012    (NO) .................................. 20120872

(51) Int. Cl.
*E21B 43/32*   (2006.01)
*E21B 34/08*   (2006.01)
(Continued)

(52) U.S. Cl.
CPC ............. *E21B 34/08* (2013.01); *E21B 34/14* (2013.01); *E21B 43/12* (2013.01); *E21B 43/32* (2013.01);
(Continued)

(58) Field of Classification Search
CPC ....... E21B 34/08; E21B 43/32; G05D 7/0133; Y10T 137/7839; Y10T 137/86718;
(Continued)

(56) References Cited

U.S. PATENT DOCUMENTS

| RE18,849 E * | 5/1933 | McClellan et al. ........ F16K 1/12 |
| | | 137/220 |
| 3,669,424 A * | 6/1972 | Shiobara ................... F02M 3/12 |
| | | 261/44.4 |

(Continued)

FOREIGN PATENT DOCUMENTS

| MX | 2014002128 | 3/2014 | |
| WO | WO 2013028335 A2 * | 2/2013 | ............. E21B 34/08 |

*Primary Examiner* — Matthew W Jellett
*Assistant Examiner* — Christopher Ballman
(74) *Attorney, Agent, or Firm* — Christian D. Abel

(57) ABSTRACT

A fluid flow control device serving as an inflow port from a fluid reservoir (R) to the interior of a production pipe (S) is in the form of a housing (3b, 3c, 3d, 3e, 3f, 3g, 3h, 3i, 3j, 3k, 3l). The housing has a primary flow path (18) and a secondary flow path (19). The secondary flow path is in fluid communication with a chamber (B) in which is arranged an actuator (5) for a valve device (4), the valve device arranged to open and close the primary flow path. At least one flow restrictor (1,2) is arranged in the secondary flow path, the flow restrictor arranged to provide a pressure to chamber (B) sufficient to actuate the valve to an open position when the fluid flowing through the secondary flow path is oil, and a pressure sufficient to actuate the valve to a closed position when the fluid has a viscosity and/or density less than oil.

8 Claims, 11 Drawing Sheets

Related U.S. Application Data

(60) Provisional application No. 61/679,805, filed on Aug. 6, 2012, provisional application No. 61/613,515, filed on Mar. 21, 2012.

(51) Int. Cl.
*E21B 43/12* (2006.01)
*G05D 7/01* (2006.01)
*E21B 34/14* (2006.01)
*F16K 31/122* (2006.01)

(52) U.S. Cl.
CPC ........... *F16K 31/1221* (2013.01); *G05D 7/01* (2013.01); *G05D 7/0133* (2013.01); *Y10T 137/0379* (2015.04); *Y10T 137/2562* (2015.04); *Y10T 137/3421* (2015.04); *Y10T 137/7839* (2015.04); *Y10T 137/7851* (2015.04); *Y10T 137/86718* (2015.04); *Y10T 137/86734* (2015.04)

(58) Field of Classification Search
CPC ..... Y10T 137/86734; Y10T 137/87265; Y10T 137/3421; Y10T 137/7851
See application file for complete search history.

(56) References Cited

U.S. PATENT DOCUMENTS

| | | | | |
|---|---|---|---|---|
| 3,734,120 A * | 5/1973 | Rowe | ................... | G05D 16/106 137/220 |
| 3,809,111 A * | 5/1974 | Olsson | ................... | F16K 17/24 137/503 |
| 4,078,475 A * | 3/1978 | Fillion | ................... | G05D 7/0133 137/87.04 |
| 4,783,043 A * | 11/1988 | Koerber | ................... | G05D 7/0133 137/505.13 |
| 5,816,286 A * | 10/1998 | Scott | ................... | G05D 16/163 137/489 |
| 6,612,541 B2 * | 9/2003 | Bush | ................... | F16K 3/085 251/129.01 |
| 6,786,225 B1 * | 9/2004 | Stark | ................... | F23N 1/007 126/116 A |
| 6,786,285 B2 * | 9/2004 | Johnson | ................... | E21B 34/08 166/250.15 |
| 7,080,654 B2 * | 7/2006 | Yada | ................... | F17D 1/08 137/1 |
| 7,185,706 B2 * | 3/2007 | Freyer | ................... | E21B 43/08 166/265 |
| 7,523,762 B2 * | 4/2009 | Buezis | ................... | F23N 1/005 137/489 |
| 7,708,068 B2 * | 5/2010 | Hailey, Jr. | ................... | E21B 43/08 166/227 |
| 8,485,220 B2 * | 7/2013 | Riano Gutierrez | .. | G05D 7/0133 137/513.3 |
| 2004/0200530 A1 * | 10/2004 | Dalton | ................... | F16K 31/402 137/489 |
| 2007/0079962 A1 * | 4/2007 | Zazovsky | ................... | E21B 49/008 166/264 |
| 2007/0256840 A1 * | 11/2007 | Aakre | ................... | E21B 34/08 166/369 |
| 2008/0041580 A1 * | 2/2008 | Freyer | ................... | E21B 34/08 166/193 |
| 2009/0084556 A1 * | 4/2009 | Richards | ................... | E21B 34/06 166/329 |
| 2009/0283275 A1 * | 11/2009 | Hammer | ................... | E21B 34/08 166/370 |
| 2011/0067878 A1 * | 3/2011 | Aadnoy | ................... | E21B 34/08 166/321 |
| 2011/0198097 A1 * | 8/2011 | Moen | ................... | E21B 34/08 166/373 |

\* cited by examiner

FLOW CONTROL DEVICE

CROSS-REFERENCES TO RELATED APPLICATIONS

This application is a Continuation under 35 U.S.C. § 120 of application Ser. No. 14/386,459, filed 19 Sep. 2014 which is a National Stage application under 35 U.S.C. § 371 of PCT/EP2016/054485 filed 6 Mar. 2013, which claimed the benefit of U.S. Provisional applications 61/679,805 filed 6 Aug. 2012 and 61/613,515 filed 21 Mar. 2012.

FIELD OF THE INVENTION

The invention concerns the control of fluid flowing into a conduit. More specifically, the invention concerns a device and a method of controlling the flow of fluids having different properties. The invention is useful in controlling flow of fluids from a subterranean hydrocarbon reservoir and into a production string. The invented device and method are useful for production fluids and in the fluid injection context.

BACKGROUND OF THE INVENTION

A well for producing hydrocarbons from a subterranean reservoir may extend through the reservoir in a number of orientations. Traditionally, reservoirs were accessed by drilling vertical wells. This is simple and straight-forward technique, but one which provided limited reservoir contact per well. Therefore, in order to access more of a reservoir per well, techniques and devices were developed to drill horizontal wells, i.e. turning the well from vertical to horizontal at a predetermined depth below the surface. So-called multi-lateral wells provide even greater access to—and contact with—the reservoir.

A major challenge in the production of hydrocarbons from subterranean reservoirs is to increase the ability to recover the oil that is present in the reservoir. Today, only a part of the oil in a given reservoir is actually recovered and produced before the field is shut down. There are thus strong incentives for developing new technology in order to increase production and oil recovery.

Two factors are of particular importance in order to increase production and rate of recovery from a reservoir:

obtaining maximum reservoir contact, and preventing negative effects of gas and/or water penetration/breakthrough (commonly referred to as "coning").

The reservoir contact is commonly achieved by drilling a number of horizontal and/or multi-lateral wells. The negative effects of coning are commonly mitigated by so-called Inflow Control Devices (ICD) placed in the production string wall. Typically, a production string in a horizontal well comprises a large number of ICDs disposed at regular intervals along its entire length. The ICDs serve as inflow ports for the oil flowing from the reservoir (normally via the annulus between the production string and the well formation) and into the production string, and are ports having a fixed flow area. So-called autonomous ICDs (AICDs) comprise one or more valve elements and are normally open when oil is flowing through the device, but chokes the flow when and where water and/or gas enters the flow. The annulus between the production string and the casing is typically divided into zones by annulus packers, which is known in the art. One or more ICDs or AICDs are then placed in each zone.

A number of ICDs are known in the art, one being described in U.S. Pat. No. 5,435,393 (Brekke, et al.) disclosing a production pipe having a production pipe with a lower drainage pipe. The drainage pipe is divided into sections with one or more inflow restrictor devices that control the flow of oil or gas from the reservoir into the drainage pipe on the basis of calculated loss of friction pressure along the drainage pipe, the calculated productivity profile of the reservoir, and the calculated inflow of gas or water.

The state of the art also includes U.S. Pat. No. 7,857,050 B2 (Zazovsky, et al.) disclosing an apparatus for use in preventing unwanted water or gas and having a flow conduit and a structure defining a tortuous fluid path proximate the flow conduit, where the tortuous fluid path receives a flow of fluid. The tortuous fluid path is defined by at least first and second members of the structure, and the first and second members are movable with respect to each other to adjust a cross-sectional flow area of the tortuous fluid path. The cross-sectional area and hence the pressure drop can be adjusted by an external force. However, the external control and force is expensive, and the number of sections is limited.

U.S. Pat. No. 7,823,645 B2 (Henriksen, et al.) discloses an inflow control device with a gas or water shut-off feature that can be operated mechanically or hydraulically from the surface of the well. The device may include a bypass feature that allows the inflow control device to be closed or bypassed via shifting of a sleeve. The flow control device can be adaptive to changes in wellbore conditions such as chemical make-up, fluid density and temperature. The device may be configured to control flow in response to changes in gas/oil ratio, water/oil ratio, fluid density and/or the operating temperature of the inflow control device. However, the external control and force is expensive and the number of zones is limited.

Autonomous ICDs (AICDs) represent an improvement of the traditional ICDs mentioned above in that they are self-controlled, i.e. without any external power supply or control.

Examples of autonomous ICDs include US 2008/0041580 A1 (Freyer, et al.) and WO 2008/004875 A1 (Aakre, et al.). While the former describes an autonomous flow restrictor with multiple flow blocking members having a density less than that of the oil, the latter discloses an autonomous flow-control device having a movable disc which is designed to move relative to an inlet opening and thereby reduce or increase the flow-through area by exploiting the Bernoulli effect and the stagnation pressure created across the disc.

US 2011/0067878 A1 (Aadnoy) describe a flow controller having a flow restrictor and a pressure-controlled actuator connected to a valve body which in turn cooperates with a valve opening. On a closing side, the actuator communicates with fluid located upstream of the valve opening and the flow restrictor. On the opening side, the actuator communicates with a fluid located downstream of the flow restrictor and upstream of the valve opening. The actuator is provided with a piston which is separated from the well fluid by at least one diaphragm-resembling seal, specifically a diaphragm having a spring constant.

US 2008/0041582 A1 (Saetre, et al.) describes a flow control apparatus having a flow restrictor positioned in the flow path between an exterior of a tubular and its passage. The flow restrictor has an active chamber and a bypass chamber, and a bypass tubing is disposed within the bypass chamber. The bypass tubing has a constant effective flow area for allowing production fluids to enter the passage from the bypass chamber. Flow blocking members are disposed within the active chamber and cooperate with outlets of the tubular to autonomously vary an effective flow area for allowing production fluids to enter the passage from the active chamber based upon the constituent composition of the production fluids.

US 2011/0198097 A1 (Moen) discloses a valve assembly for regulating fluid flow in a horizontal wellbore. A housing is coupled to a production tubular, has a chamber which is in fluid communication through a flow channel with an inner annulus formed adjacent to the wellbore. A piston and a biasing member are disposed within the chamber, where the biasing member biases the piston into a first position. A flow path is defined within the housing and communicable with both the production tubular and the inner annulus. The flow path can include one or more nozzles disposed therein, and the piston can be configured to move between the first position allowing fluid flow through the flow path to the production tubular and a second position preventing fluid flow to the production tubular. The position is determined by the pressure drop.

US 2011/0308806 A9 (Dykstra, et al.) describes an apparatus for controlling flow of fluid in a tubular positioned in a wellbore extending through a subterranean formation. A flow control system is placed in fluid communication with a main tubular. The flow control system has a flow ratio control system and a pathway dependent resistance system. The flow ratio control system has a first and second passageway, the production fluid flowing into the passageways, where the ratio of fluid flow through the passageways relates to the characteristic of the fluid flow. The pathway dependent resistance system includes a vortex chamber with a first and second inlet and an outlet, the first inlet of the pathway dependent resistance system being in fluid communication with the first passageway of the fluid ratio control system and the second inlet being in fluid communication with the second passageway of the fluid ratio control system. The first inlet is positioned to direct fluid into the vortex chamber such that it flows primarily tangentially into the vortex chamber, and the second inlet is positioned to direct fluid such that it flows primarily radially into the vortex chamber. Undesired fluids in an oil well, such as natural gas or water, are directed, based on their relative characteristic, primarily tangentially into the vortex, thereby restricting fluid flow when the undesired fluid is present as a component of the production fluid.

A common advantage of all the above mentioned examples of AICDs it that they contribute to a more even inflow along the well path compared to nozzles in traditional ICDs. The purpose is to delay the gas and/or water breakthrough as much as possible. However, they all suffer from the disadvantage that the production is choked also for the oil. The result is an overall increase in the degree of extraction (recovery) around the wells compared with the traditional ICDs, but with a significant loss of production (barrel/day) during the initial phase of the well's lifetime.

Furthermore, solutions such as those disclosed in US 2011/0067878 and US 2011/0198097 A1 would neither choke nor close for undesired phases (gas/water) at the moment of their breakthroughs.

US 2008/0041580 A1, WO 2008/004875 A1, US 2008/0041582 A1 and US 2011/0308806 A9 all contribute to a ICD character having an autonomic ability that to a certain degree choke undesired phases, though not to the extend of coming to a full, or close to full, halt in the inflow. Publications US 2008/0041580 A1 and US 2008/0041582 A1 would, in addition, not exhibit any reversible property, that is, the ability to autonomically reopen a valve that has been shut due to entrance of undesired phases at the moment when oil again starts to flow into the well.

AICDs having the ability to autonomically close, or almost close, such undesired phases are also known in the art.

One example is found in the publication U.S. Pat. No. 7,918,275 B2 which describes an apparatus having a flow control member that selectively aligns a port with an opening in communication with a flow bore of a well bore tubular. The flow control member may have an open position and a close position wherein the port is aligned with the opening and misaligned with the opening, respectively. The flow control member moves between the open position and closed position in response to a change in drag force applied by a flowing fluid. A biasing element urges the flow control member to the open or the closed position. The apparatus may include a housing receiving the flow control member. The flow control member and the housing may define a flow space that generates a Couette flow that causes the drag force. The flow space may include a hydrophilic and/or water swellable material.

However, a major problem with the solution disclosed in U.S. Pat. No. 7,918,275 B2 is that the valve is in closed position at the time of installation, during which the fluid velocity and friction is zero. Hence, there will be no force to actuate the opening. If this problem is solved it would anyway be difficult to control the opening/closing of the valve based on the flow friction since the latter is normally small compared to the friction of the valve mechanisms. In addition, the functionality of any reversible property based of drag force/friction seems doubtful.

Another example of a document disclosing a solution for an AICD which may be autonomically closed is found in publication US 2009/0283275 A1 describing an apparatus for controlling a flow of fluid into a wellbore tubular. The apparatus includes a main flow path associated with a production control device, an occlusion member positioned along the main flow path that selectively occludes the main flow path, and a reactive media disposed along the main flow path that change a pressure differential across at least a portion of the main flow path by interacting with a selected fluid. The reactive media may be a water swellable material or an oil swellable material.

Hence US 2009/0283275 A1 will for an oil reactive material installed in the main flow path results in a higher flow resistance during throughput of desired phases such as oil relative to no reactive media. A reactive material that stops the water/gas and not the oil is unknown for the inventors. The publication does not make use of a second, pilot flow as the present invention to overcome any hindering of the main flow.

The publication U.S. Pat. No. 7,819,196 B2 also describe a flow controller having a flow restrictor and a pressure-controlled actuator connected to a valve body, which in turn cooperates with a valve opening. An osmotic cell is used to operate the actuator, which cell is being placed in the fluid flow, whereby the necessary motion of the actuator to drive a valve is achieved by utilising the osmotic pressure difference between the solution in the cell and the external fluid flow/reservoir in relation to the cell. This concept has been shown to work in accordance with its principles, exhibiting a high initial oil production while at the same time closing for undesired phases. However, the solution is dependent on a membrane that should manage the harsh well conditions (high pressure and temperature, fouling, etc.) in a satisfactory way. Such a membrane is presently not known in the field.

The purpose of the present invention is to overcome the shortcomings of the prior art and to obtain further advantages.

SUMMARY OF THE INVENTION

The invention is set forth and characterized in the main claims, while the dependent claims describe other characteristics of the invention.

It is thus provided a fluid flow control device comprising a housing having a fluid inlet and at least one fluid outlet, characterized by a first fluid flow restrictor serving as an inflow port to a chamber in the housing, and a second fluid flow restrictor serving as an outflow port from the chamber, and wherein the first fluid flow restrictor and the second fluid flow restrictor are configured to generate different fluid flow characteristics; and the chamber comprises actuating means that is responsive to fluid pressure changes in the chamber.

In one embodiment, the fluid flow control device comprises a valve device arranged between the fluid inlet and the at least one fluid outlet, and operatively connected to the actuating means.

The first fluid flow restrictor and the second fluid flow restrictor are configured to impose its respective different fluid flow characteristics based on different fluid properties.

In one embodiment, the first fluid flow restrictor is configured to impose substantially laminar flow characteristics on a fluid flowing through the restrictor, and the second fluid flow restrictor is configured to impose substantially turbulent flow characteristics on a fluid flowing through the restrictor. In one embodiment, the first fluid flow restrictor is configured to impose flow characteristics based on fluid viscosity, and the second fluid flow restrictor is configured to impose flow characteristics based on fluid density.

The first fluid flow restrictor may be a porous element and the second fluid flow restrictor an orifice.

The first fluid flow restrictor serves advantageously as the sole inflow port to the chamber, and the second fluid flow restrictor serves advantageously as the outflow port from the chamber.

In one embodiment, the housing comprises a primary flow path and a secondary flow path, and the fluid flow restrictors and the chamber are arranged in the secondary flow path. In one embodiment, the valve device is arranged to close the primary flow path.

The first fluid flow restrictor may be a part of the valve device and/or the second fluid flow restrictor may be a part of the valve device.

In one embodiment, the valve device comprises a movable body connected via flexible bellows to the housing. In another embodiment, the valve device comprises a movable piston arranged for sliding movement inside the housing.

In one embodiment, the fluid flow control device comprises a fluid restrictor element configured to progressively choke the flow out of the orifice as the valve device is moved towards a closing position.

It is also provided a method of controlling fluid flow through a housing based on changes in fluid properties, characterized by:
  allowing at least a portion of the fluid to flow through a first fluid flow restrictor, into a chamber and out of the chamber via a second fluid flow restrictor;
  utilizing the pressure change in the chamber that occurs when a property of the fluid changes to operate a valve device and thereby controlling the fluid flow through the housing.

In one embodiment of the method, said property of the fluid comprises viscosity. In another embodiment of the method, said property of the fluid comprises density. In one embodiment, the method comprises generating a substantially laminar flow by the first fluid flow restrictor, and generating a substantially turbulent flow by the second fluid flow restrictor.

The invention utilizes the change in pressure that occurs between two fluid restrictors when the fluid properties (such as viscosity) change. This change in pressure is used to move a body and/or actuate a valve.

Although embodiments of the invention have been described with the flow restrictors being a porous element and an orifice, the invention is equally applicable to other flow restrictors, such as e.g. a long conduit and/or an abrupt geometry change in a conduit.

The inventive flow control device stops unwanted fluids (e.g. water, gas, steam and $CO_2$) from entering production flow of a desired fluid (e.g. oil) in a better manner than what known ICDs and AICDs do. The invented flow control device is robust and fully autonomous. It is reversible in that the valve device changes position as the properties (e.g. viscosity) of the fluid changes. That is, where for example the flow control device closes when the viscosity decreases (i.e. exposed to water or gas), it opens again when the viscosity increases (i.e. exposed to oil).

There is a significant economical gain in preventing choking of the initial oil production (present value) and increasing the degree of production due to efficient closure of undesired fluid phases such as water and/or gas. The estimated increase in the production and recovery from a well, which will be a function of the reservoir and fluid properties, will be at least 10%. The production cost of the inventive valve is close to insignificant compared to the potential gain due to increased oil production.

BRIEF DESCRIPTION OF THE DRAWINGS

These and other characteristics of the invention will be clear from the following description of embodiments, given as non-restrictive examples, with reference to the attached sectional sketches and drawings wherein.

DETAILED DESCRIPTION OF EMBODIMENTS

Figure 1A:
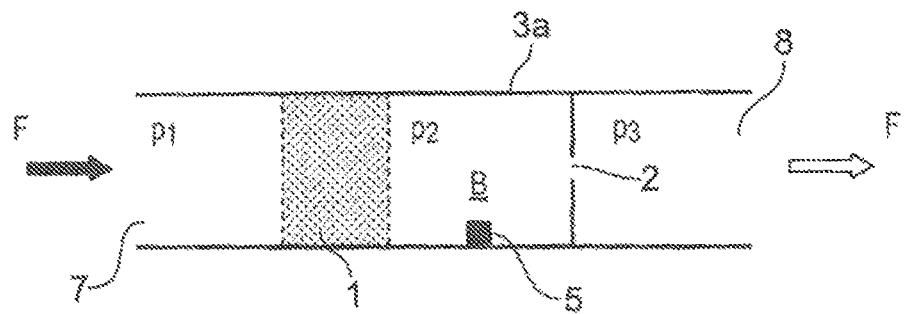
FIG. 1a illustrates a principle behind the invention and the invented flow control device in a basic form.

FIG. 1a illustrates how a fluid F flows into a conduit 3a at a first pressure $p_1$, through a first flow restrictor 1 and into a chamber B where it attains a second pressure $p_2$, and then flows through a second fluid flow restrictor 2 before it exits the conduit 3a at a third pressure $p_3$. When the fluid flow rate and fluid properties (e.g. viscosity, density) are constant, the pressures ($p_1$, $p_2$, $p_3$) are constant, and $p_1, >p_2, >p_3$.

In FIG. 1a, the first flow restrictor 1 is a porous element and the second flow restrictor 2 is an orifice.

In general, the flow characteristics through a porous medium may be described using Darcy's law (i.e. laminar flow), expressed as:

$$Q = \frac{\kappa_{perm} \cdot A}{\mu} \frac{\Delta P}{\Delta L} \quad \text{(Equation 1)}$$

where: Q=fluid flow rate (units of volume per unit time)
$\kappa_{perm}$=relative permeability of the porous medium (typical unit: Darcy)
A=cross-sectional area of the porous medium
μ=viscosity of the fluid (typical unit: centipoise; SI unit: Pa*s)
ΔP=differential fluid pressure across the permeable medium (typical unit: Pa), and
ΔL=the length of the porous medium running parallel to the fluid flow.

Thus, when flowing through the porous element 1, the fluid will undergo a pressure drop ΔP (from $p_1$ to $p_2$ in FIG. 1a) in accordance with Darcy's law (Equation 1), from which it may be derived that the change in pressure (ΔP) across the porous element is proportional to the fluid viscosity (μ) and the fluid flow rate (Q).

The flow characteristics in a fluid flowing through an orifice or another restrictor (i.e. turbulent flow), may be expressed as:

$$\Delta P = K_{orifice} \frac{\rho \cdot v^2}{2} \quad \text{(Equation 2)}$$

where: ΔP=differential fluid pressure across the orifice (typical unit: Pa)
$L_{orifice}$=orifice-specific coefficient (dimensionless)
ρ=fluid density (unit of mass per unit of volume)
v=fluid velocity (units of length per unit time)

Thus, when flowing through the orifice 2, the fluid experiences a pressure drop (ΔP) (from $p_2$ to $p_3$) which may be described by equation 2. The change in fluid pressure across the orifice is almost independent of viscosity, but proportional to the density and the orifice coefficient, and to the fluid velocity squared.

Figure 1B:
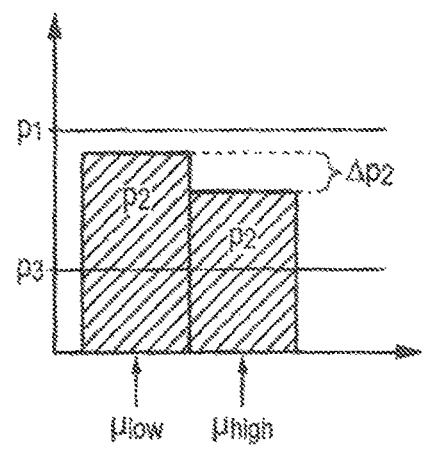
FIG. 1b illustrates the correlation between change in pressure inside the chamber (i.e. between the fluid restrictors), and the change in fluid viscosity.

Therefore, referring to FIG. 1a, the fluid pressure $p_2$ in the chamber B—between the porous element 1 and the orifice 2—will change if the properties (viscosity or density) of the fluid changes. This is illustrated graphically in FIG. 1b, showing a first (lower) value for $p_2$ at a higher fluid viscosity ($\mu_{high}$) and a second (higher) value for $p_2$ at a lower fluid viscosity ($\mu_{low}$). This difference between the values for $p_2$ ($\Delta P_2$) occurring when the viscosity changes (e.g. decreases) may be used to perform work, for example actuate an actuator 5, which in turn may move a piston/body and/or a valve (not shown in FIG. 1a).

Although the invention is explained hereinafter with reference to fluids flowing through a porous element and an orifice, and utilizing the change in viscosity, it should be understood that the invention applies to any combination of fluid flow restrictors where the first provides turbulent flow (completely or substantially) and the other provides laminar flow (completely or substantially), or vice versa.

In general, the present invention utilizes the change in pressure ($\Delta P_2$) that occurs between two different flow restrictors when subjected to fluids of different properties, e.g. oil and water. These properties may be viscosity, as described above, but also density, as is evident from Equation 2. The two flow restrictors are configured to impose different flow characteristics on the fluids. In the example discussed above, the first flow restrictor 1 generates a substantially laminar flow and the second flow restrictor 2 generates a substantially turbulent flow.

Figure 2:
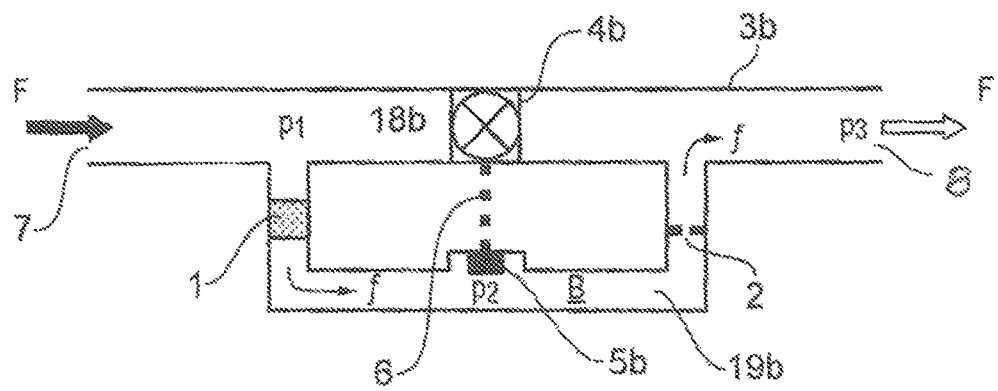
FIG. 2 is a principle sketch of the flow control device of the invention.

FIG. 2 is a schematic illustration of one application of the principle described above, and illustrates an embodiment of the invented flow control device in a basic form (i.e. seals, gaskets and other required ancillary parts known in the art are not shown). A fluid flow (F) enters a housing 3b having a primary flow path (conduit) 18b and a secondary flow path (conduit) 19b. The major portion ($F_O$) of the fluid (F) flows through the primary conduit 18b and a valve 4b (which initially is open), while a smaller portion (f) of the fluid (F) flows through the secondary conduit 19b via a first fluid restrictor 1 in the form of a porous member (generating laminar flow) and via a second fluid restrictor 2 in the form of an orifice, before it re-enters the primary conduit 18b and exits out of the conduit 18b. When the viscosity (μ) of the fluid (F) flow changes, the pressure $p_2$ in the chamber B situated in the secondary conduit 19b (defined by the two fluid restrictors) also changes as described above. For example, if a flow of oil F is replaced by water, the viscosity decreases and the pressure $p_2$ increases (as explained above with reference to FIGS. 1a and 1b).

FIG. 2 furthermore shows (schematically) that an actuator 5b is arranged in the chamber B. The actuator 5b is connected via transmission means 6 (e.g. hydraulic linkage, mechanical linkage or signal cable) to the valve 4b. When the fluid viscosity (μ) changes as described above, the difference in values for $p_2$ ($\Delta P_2$, see FIG. 1b) imparts an actuating force on the actuator 5b, which in turn operates (e.g. closes) the valve 4b. Thus, the conduits and fluid restrictors may be configured and dimensioned such that (when breakthrough is to be prevented) the valve 4b automatically closes when the viscosity (μ) of the fluid (F) drops below a predetermined level. Thus, in an oilfield application, this device prevents unwanted water and/or gas inflow into a production string.

Figure 3:
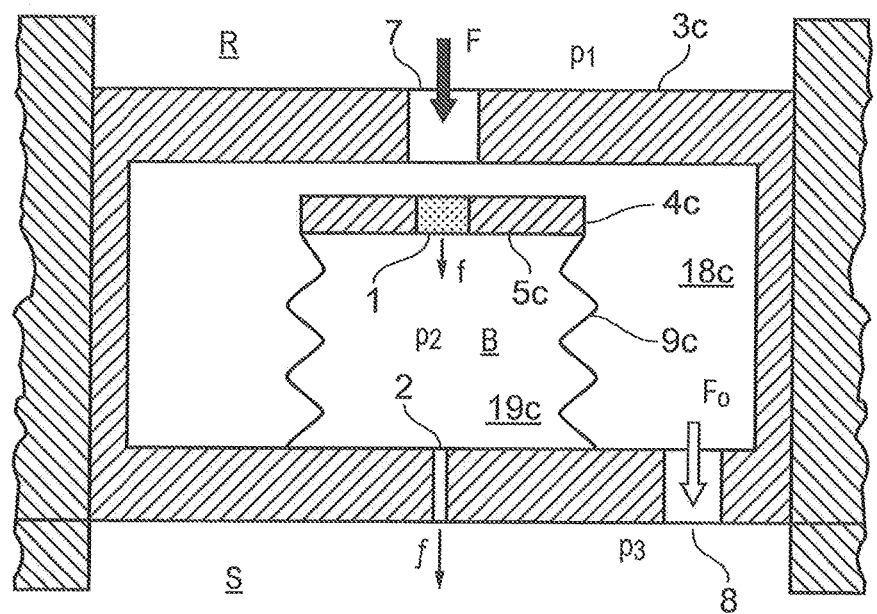
FIG. 3 is a principle sketch illustrating a second embodiment of the flow control device according to the invention.

Another embodiment of the invented flow control device is schematically illustrated in FIG. 3. A housing 3c is arranged in a flow path between a fluid reservoir R and the interior of a production pipe S. The housing 3c comprises an inlet 7 in fluid communication with the reservoir R and an outlet 8 in fluid communication with the production pipe S. Inside the housing 3c is a valve member 4c in the form of a movable body or piston (hereinafter also generally referred to as a body). The body 4c is supported in the housing 3c by bellows 9c comprising a structural and resilient member such as a helical spring (not shown). The body 4b further comprises a first fluid restrictor 1 in the form of a porous member. The body 4c and bellows 9c define a chamber B inside the housing 3c, while a second fluid restrictor 2 in the form of an orifice provides a fluid outlet from the chamber B.

In use, a fluid flow F (e.g. oil from a subterranean reservoir) enters the housing 3c through the inlet 7. Inside the housing 3c, the major portion $F_0$ of the fluid F follows a primary conduit 18c before it exits the housing 3c through the outlet 8 and flows into the production pipe S. The remaining portion f of the fluid F flows through the porous member 1 in the body 4b and into a secondary conduit 19c defined by the chamber B before it exits the chamber B through the orifice 2, and flows into the production pipe S. If water and/or gas enters the flow F, causing the overall viscosity μ to drop, the resulting difference in values for $p_2$ ($\Delta P_2$, see FIG. 1b) is serving to exert a pressure against a body surface 5c. This change in pressure, acting on the body surface 5c, generates a motive force which serves to close the body 4c against the inlet 7, thus preventing fluid from entering the housing 3c.

Figure 4:
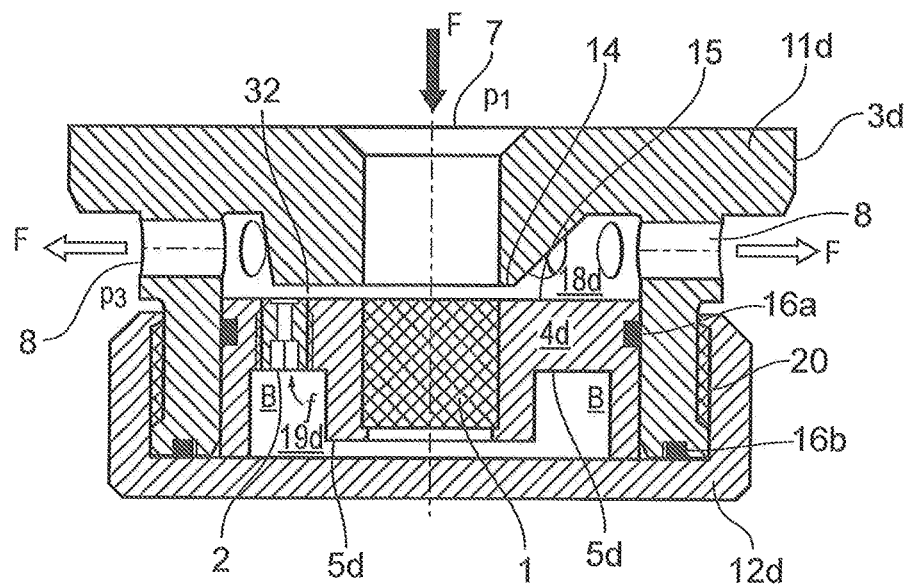
FIG. 4 illustrates a third embodiment of the flow control device according to the invention.

FIG. 4 illustrates yet another embodiment of the invented flow control device. The housing 3d comprises an upper part 11d and a lower part 12d. The two parts 11d,12d are joined together by a threaded connection 20 with seals (e.g. o-rings) 16b. The housing 3d has an inlet 7 and radially arranged outlets 8. A member 4d is arranged for movement (in the figure: up and down) inside the housing 3d. O-rings 16a seal between the movable member and the housing interior wall. A chamber B is thus defined by the movable member 4d and the lower part 12d of the housing 3d. The movable member 4d (in this embodiment: a piston) comprises a first fluid restrictor 1 in the form of a porous member and a second fluid restrictor 2 in the form of an orifice.

This embodiment of the flow control device further comprises a fluid restrictor element 32, here in the form of a face which serves to progressively choke the flow out of the orifice 2 as the movable piston 4d is moved towards the sealing surface 14.

In use, a fluid flow F (e.g. oil from a subterranean reservoir) enters the housing 3d through the inlet 7. Inside the housing 3d, the major portion $F_0$ of the fluid F follows a primary conduit 18d before it exits the housing 3d through the outlets 8. A portion f of the fluid F flows through the porous member 1 in the piston 4d and into the chamber B before it exits the chamber though the orifice 2, and is mixed with the flow from the primary conduit. In this embodiment of the control device, the difference in values for $p_2$ ($\Delta P_2$) as the fluid viscosity μ changes, is serving to exert a pressure against a piston surface 5d. This change in pressure, acting on the piston surface 5d, generates a motive force which serves to close the piston 4d against the inlet 7. The sealing surfaces 14 and 15 are brought together, thus substantially preventing fluid from entering the housing 3d.

Figure 5:
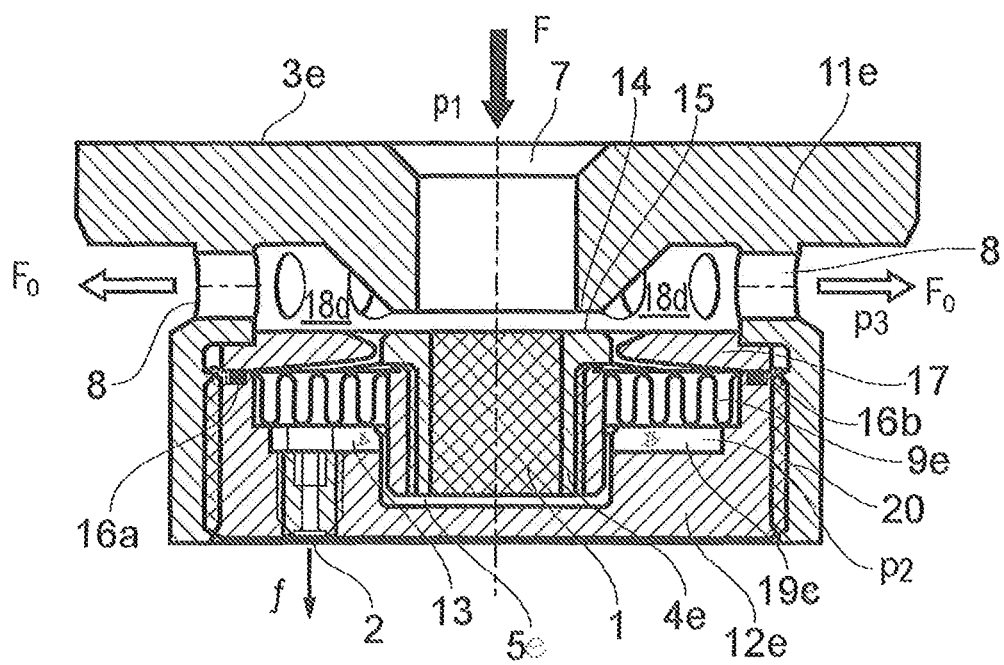
FIG. 5 illustrates a fourth embodiment of the flow control device according to the invention.

FIG. 5 illustrates a further embodiment of the inventive flow control device. The housing 3e comprises an upper part 11e and a lower part 12e, in which the upper and lower parts 11e,12e are joined together by a threaded connection 20 with seals (e.g. o-rings) 16b. The housing 3e has an inlet 7 and radially arranged outlets 8. A member 4e is arranged for movement (in the figure: up and down) inside the housing 3e, guided by a supporting structure 17. Resilient bellows 9e extend between the movable member 4e and the lower housing 12e, thus forming a chamber B together with the movable member 4e and the lower part 12e of the housing 3e. The movable member 4e comprises a first fluid restrictor 1 in the form of a porous member, and the lower housing 12e comprises a second fluid restrictor 2 in the form of an orifice.

In use, a fluid flow F (e.g. oil from a subterranean reservoir) enters the housing 3e through the inlet 7. Inside the housing 3e, the major portion $F_0$ of the fluid F follows a primary conduit 18e before it exits the housing 3e through the outlets 8. A portion f of the fluid F flows through the porous member 1 in the movable member 4e and into the chamber B before it exits the chamber B though the orifice 2. In this embodiment of the control device, the difference in values for $p_2$ ($\Delta P_2$, see FIG. 1b) as the fluid viscosity μ changes is serving to exert a pressure against a surface 5e on the movable member and thereby to close the movable member 4e against the inlet 7. The sealing surfaces 14, 15 are hence brought together, resulting in a substantially prevention of fluid F from entering the housing 3e.

Figure 6:
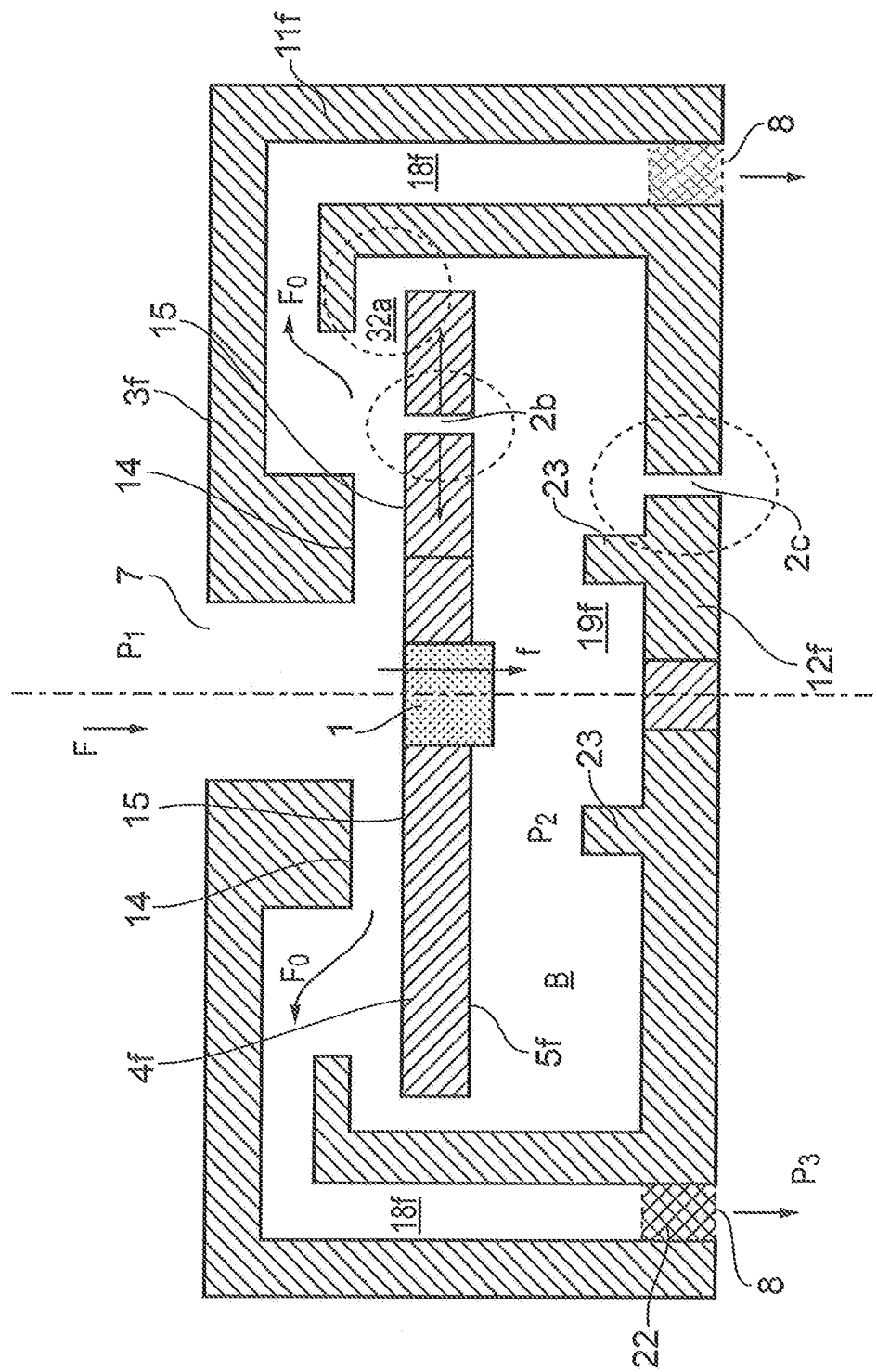
FIG. 6 illustrates a fifth embodiment of the flow control device according to the invention.

FIG. 6 illustrates a further embodiment of the invented flow control device. The housing 3f comprises an upper part 11f and a lower part 12f, the upper and lower parts 11f,12f being joined together to form a primary conduit 18f that runs along the interior walls of the housing 3f from the inlet 7 to radially arranged outlets 8. The joining of the two parts 11f,12f may for example be obtained by screw connection or welding (not shown). A piston-shaped member 4f is arranged for translational movement (in the figure: up and down) inside the housing 3f, guided by a suitable supporting structure, thus forming a chamber B situated between a lower surface 5f of the member 4f and the inner walls of the lower part 12f. The movable member 4f comprises a first fluid restrictor 1 in the form of a porous member and a second fluid restrictor 2b in the form of an orifice, thereby forming a second conduit 19f defined by the chamber B. Both the first 1 and the second restrictor 2b extend axially through the member 4f. The size of the orifice 2b opening may advantageously be of variable radial width. Likewise, the lower housing 12f may comprise another second fluid restrictor 2c in the form of an orifice. In yet another embodiment an appropriate filter 22 may be arranged at one or more of the outlets 8 to prevent any impurities such as particles to enter (and thus block or limit) the flow. The movable member 4f and the lower housing 12f are configured to form a fluid restrictor element or area 32a, here in the form of a corner opening, which serves to progressively choke the flow out of the orifice 2b,2c as the pressure builds up in chamber B and in the fluid restrictor area 32a. The purpose of the illustrated protrusions 23 is to avoid complete closure of orifice(s) 2 during flow of fluid phases having lower viscosities than the desired phases such as oil.

In use, a fluid flow F (e.g. oil from a subterranean reservoir) enters the housing 3f through the inlet 7. Inside the housing 3f, the major portion $F_0$ of the fluid F follows a primary conduit 18f before it exits the housing 3f through the outlets 8. A minor portion f of the fluid F flows through the porous member 1 in the movable member 4f and into the chamber B before it exits the chamber B though the orifice 2b located in the movable member 4f and/or the orifice 2c located in the lower part 12f. Also in the embodiment of the control device shown in FIG. 6, the difference in values for $p_2$ ($\Delta P_2$, see FIG. 1b) as the fluid viscosity μ changes is serving to exert a pressure against the lower surface 5f on the movable member 4f and to close the movable member 4f against the inlet 7. Sealing surfaces 14, 15 on the inside walls of the upper part 11*f* and the upper surface of the movable member 4*f*, respectively, are thus brought together to substantially prevent fluid F from entering the housing 3*f*. Due to its reinforcing stagnation effect the fluid restrictor area 32*a* contributes to a more efficient closing of the primary conduit 18*f* during entrance of fluid phases having low viscosities.

Figure 7:
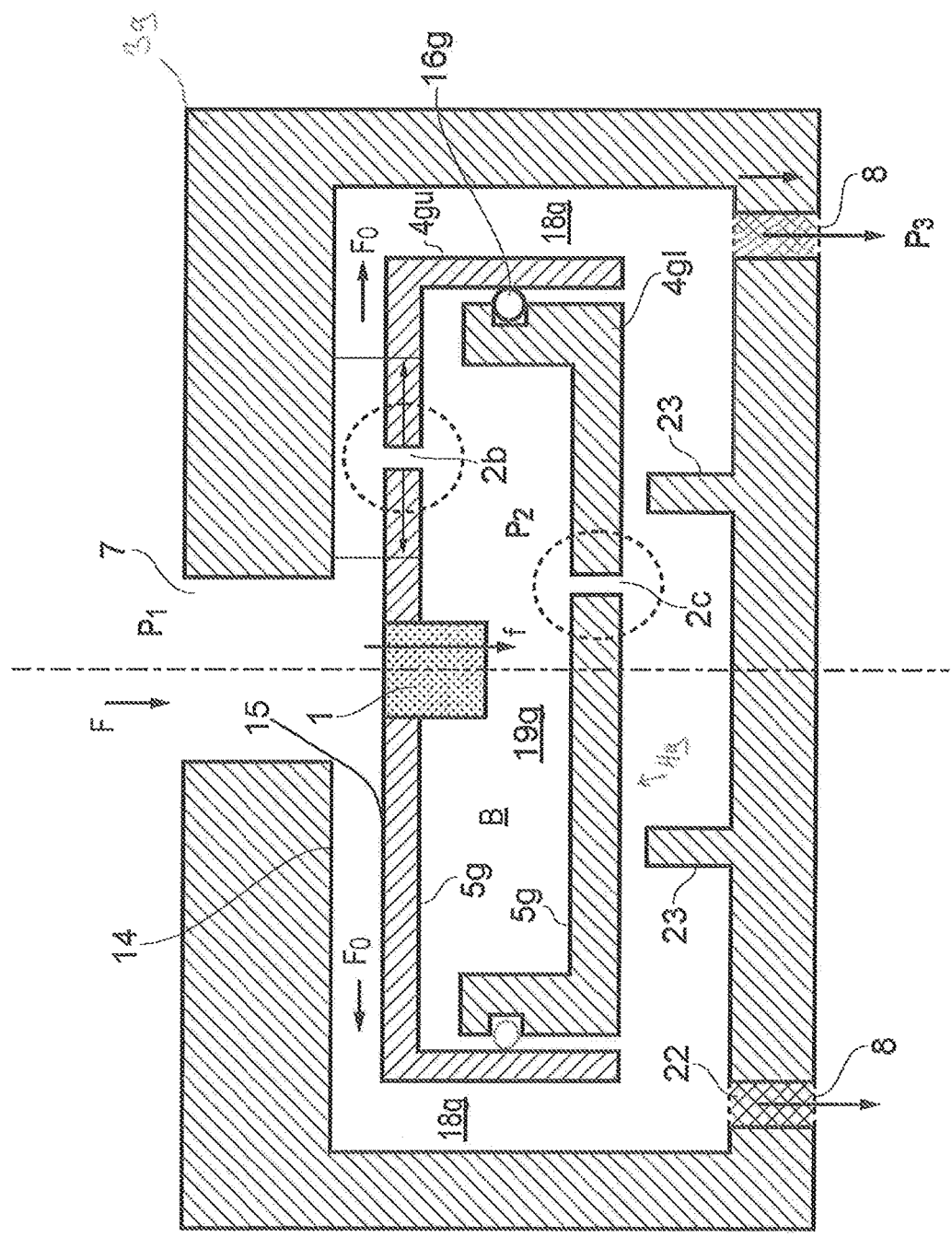
FIG. 7 illustrates a sixth embodiment of the flow control device according to the invention.

FIG. 7 illustrates a further embodiment of the inventive flow control device. The housing 3*g* constitutes an integral part where its interior are constructed to form a primary conduit 18*g* running along the interior walls of the housing 3*g* from the inlet 7 to one or more radially arranged outlets 8. A translationally movable member 4*g* arranged inside the housing 3*g* is composed of an upper part 4*gu* and a lower part 4*gl*, e.g. joined together by a threaded connection (not shown) and seals (e.g. o-rings) 16*g*. The upper 4*gu* and lower 4*gl* parts of the member 4*g* may be guided by an appropriate supporting structure (not shown) and configured for opposite directed relative movements (in the figure: up and down) inside the housing 3*g*. A chamber B is thus defined by the interior walls of the assembled member 4*g*. The member 4*g* (in this embodiment: a piston) further comprises a first fluid restrictor 1 in the form of a porous member and two second fluid restrictors 2*b*,2*c*, e.g. in the form of an variable and a fixed orifice, respectively, thereby forming a second conduit 19*g* defined by the chamber B. Alternatively the control device may have just one orifice 2 of either variable type 2*b* or fixed type 2*c*, or two fluid restrictors 2 of the same type. As for the embodiment shown in FIG. 6 a filter 22 may be arranged in one or more of the outlets 8 to prevent any impurities such as particles to enter and thus block or limit the flow. The purpose of the illustrated protrusions 23 is to avoid complete closure of orifice 2*c* during flow of fluid phases with lower viscosities than desired phases such as oil.

In use, a fluid flow F (e.g. oil from a subterranean reservoir) enters the housing 3*g* through the inlet 7. Inside the housing 3*g*, the major portion $F_0$ of the fluid F follows a primary conduit 18*g* before it exits the housing 3*g* through the outlet(s) 8. A portion f of the fluid F flows through the porous member 1 arranged in the movable member 4*g* and into the chamber B before it exits the chamber B through the orifice 2*b* located on the upper part 4*gu* of movable member 4*g* and/or the orifice 2*c* located on the lower part 4*g*1 of the movable member 4*g*. Also in this embodiment of the control device, the difference in values for $p_2$ ($\Delta P_2$, see FIG. 1*b*), as the fluid viscosity μ changes, is serving to exert a pressure against surfaces 5*g* on the interior walls of the movable member 4*g* and therefore to close the upper part 4*gu* against the inlet 7. The sealing surfaces 14,15 are thus brought together, thus substantially preventing fluid F from entering the housing 3*g*.

Figure 8:
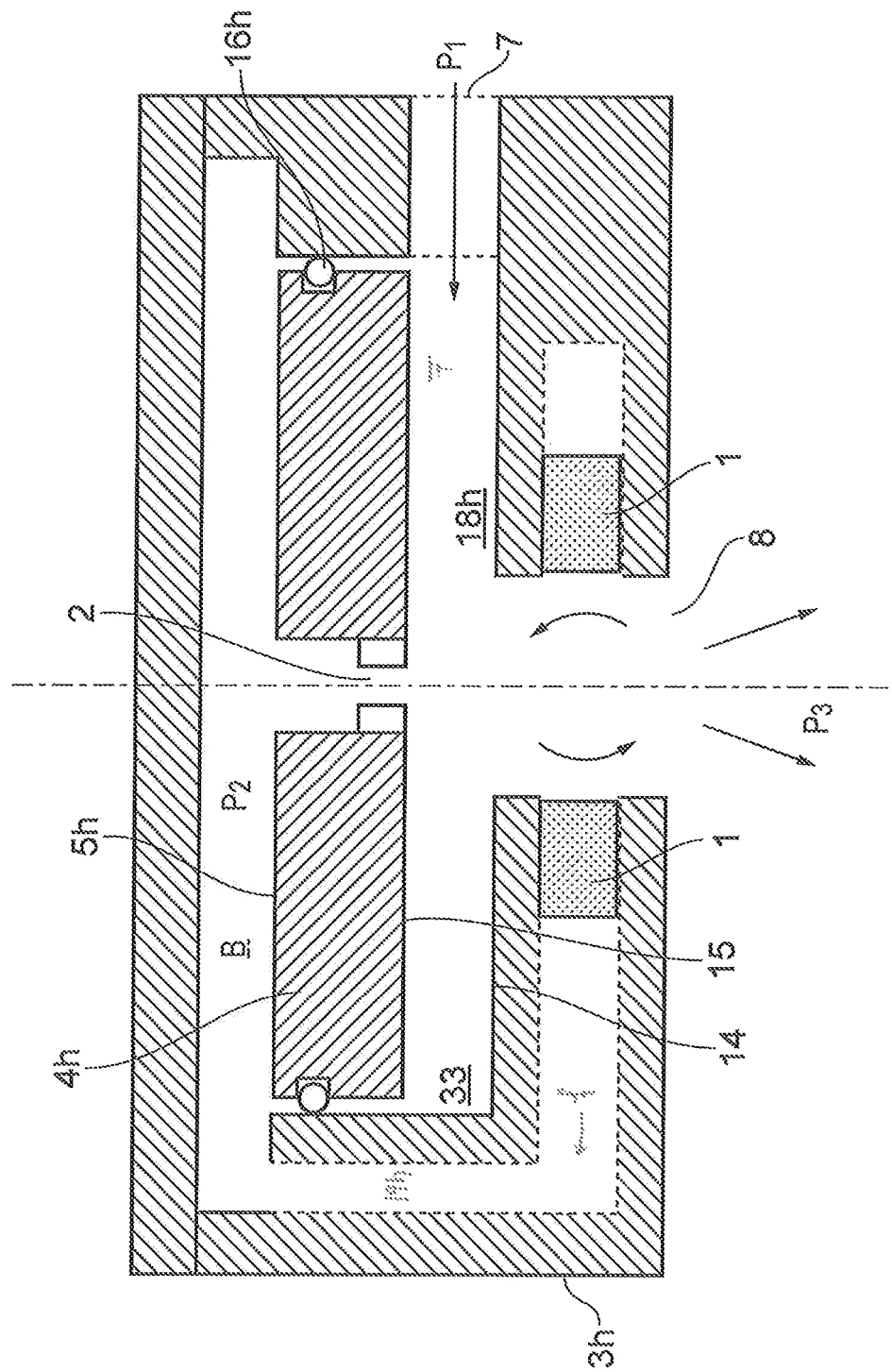
FIG. 8 illustrates a seventh embodiment of the flow control device according to the invention.

FIG. 8 illustrates a further embodiment of the inventive flow control device. The housing 3*h* constitutes one part, where its interior is constructed to form a primary conduit 18*h* running along the interior walls of the housing 3*h* from a tangential inlet 7 to an outlet 8. A member 4*h*, in this example formed as a piston, is arranged via appropriate seals 16*h* to the inside of housing 3*h*, thereby forming a chamber B between an upper surface 5*h* of the member 4*h* and the upper interior walls in the housing 3*h*. The member 4*h* may be movable (in this embodiment: a piston going up and down) or may comprise bellows (or any other stretchable means) extending at least partly over the radial cross section set by the interior walls of the housing 3*h*. Alternatively the member 4*h* may be a combination of bellows/stretchable means and more rigid material(s). The member 4*h* may furthermore optionally comprise one or more second fluid restrictors 2 in the form of orifice(s) located e.g. in the center of the member 4*h*. Further, one or more conduits 19*h* extending within the housing 3*h* from the outlet 8 to the chamber B have optionally porous element(s) 1 arranged in the conduit(s) 19*h*. The induced whirls at the outlet 8 creates a high pressure area which results in a higher pressure in chamber B, and thus a more efficient closure. The combination of one or more second fluid restrictors 2 and said conduit(s) 19*h* constitutes a secondary conduit for flow of a minor portion f of the fluid F.

In use, a fluid flow F (e.g. oil from a subterranean reservoir) enters the housing 3*h* through the tangential inlet 7. Inside the housing 3*h* the fluid F follows a primary conduit 18*h* before it exits through the outlet 8, inducing a high pressure area with whirls. A minor portion f of the fluid F may flow into the conduit(s) 19*h*, optionally through any porous member(s) 1, further into the chamber B and out though the orifice(s) 2 in member 4*h*. Also in this embodiment of the invention, the difference in values for $p_2$ ($\Delta P_2$, see FIG. 1*b*), as the fluid viscosity μ changes, is serving to exert a pressure against the upper surface 5*h* on the member 4*h*. The sealing surfaces 14, 15 are brought together and thus substantially prevent fluid F from entering the housing 3*h*. Alternatively, if there are no second fluid restrictors 2 in the member 4*h* the stagnation pressure created in a stagnation area 33 and in the chamber B would still effectively force the member 4*h* down and thus substantially prevent fluid F from entering the housing 3*h*, either by rigid movement or by expansion of the bellows downward, or a combination thereof.

Figure 9:
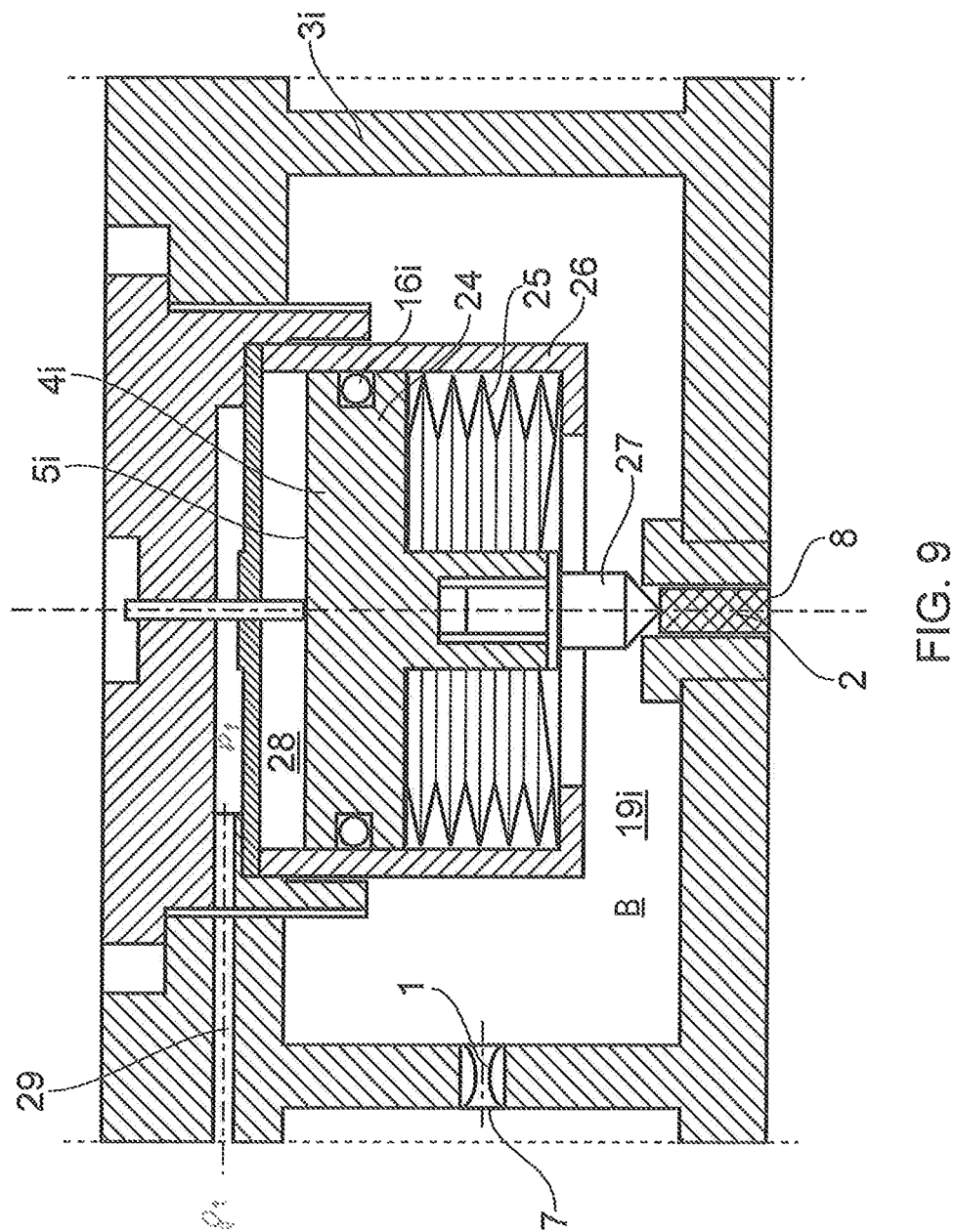
FIG. 9 illustrates an eight embodiment of the flow control device according to the invention.

FIG. 9 illustrates another embodiment of an inflow control device, wherein the housing 3*i* forms a chamber B having an inlet 7 and an outlet 8 constituting a first fluid restrictor 1 in the form of an orifice and a second fluid restrictor 2 in the form of an opening with an inserted porous material, respectively, thereby creating a second conduit 19*i* defined by the chamber B. Except for the introduction of a porous material at the outlet 8 creating a mainly laminar flow at its downstream side during use, and the construction of the orifice at the inlet 7 creating a mainly turbulent flow at its downstream side during use, the structural construction of the device is similar or identical to the device disclosed in the publication US 2011/0067878 A1, which hereby is included by reference.

In use, a fluid flow F enters the housing 3*i* through the inlet/orifice 7,1. If the viscosity of the flowing fluid is sufficiently high, such as oil, a translationally moving member/actuator 4*i* comprising a piston 24 and spring 25 attached by appropriate seals 16*i* inside a second chamber 26, is in an open position, i.e. a valve member 27 enabling blocking of the outlet 8 has been lifted by the actuator 4*i*. This is a consequence of the corresponding high pressure ($p_2$) formed inside the chamber B due to the high resistance set up by the second fluid restrictor at the outlet 8, which again causes the upward movement of the piston 24. Likewise, fluids with sufficiently low viscosity such as water or gas would not create sufficient pressure in chamber B to maintain the piston 24 in a raised position, thereby causing a closure of the outlet 8. An upper chamber 28 shown above the piston 24 is set in fluid communication with the outside of housing 3*i* via an upper conduit 29, thus ensuring a constant downward force of the actuator 4*i* which corresponds to the prevailing exterior pressure ($p_1$).

Figure 10:
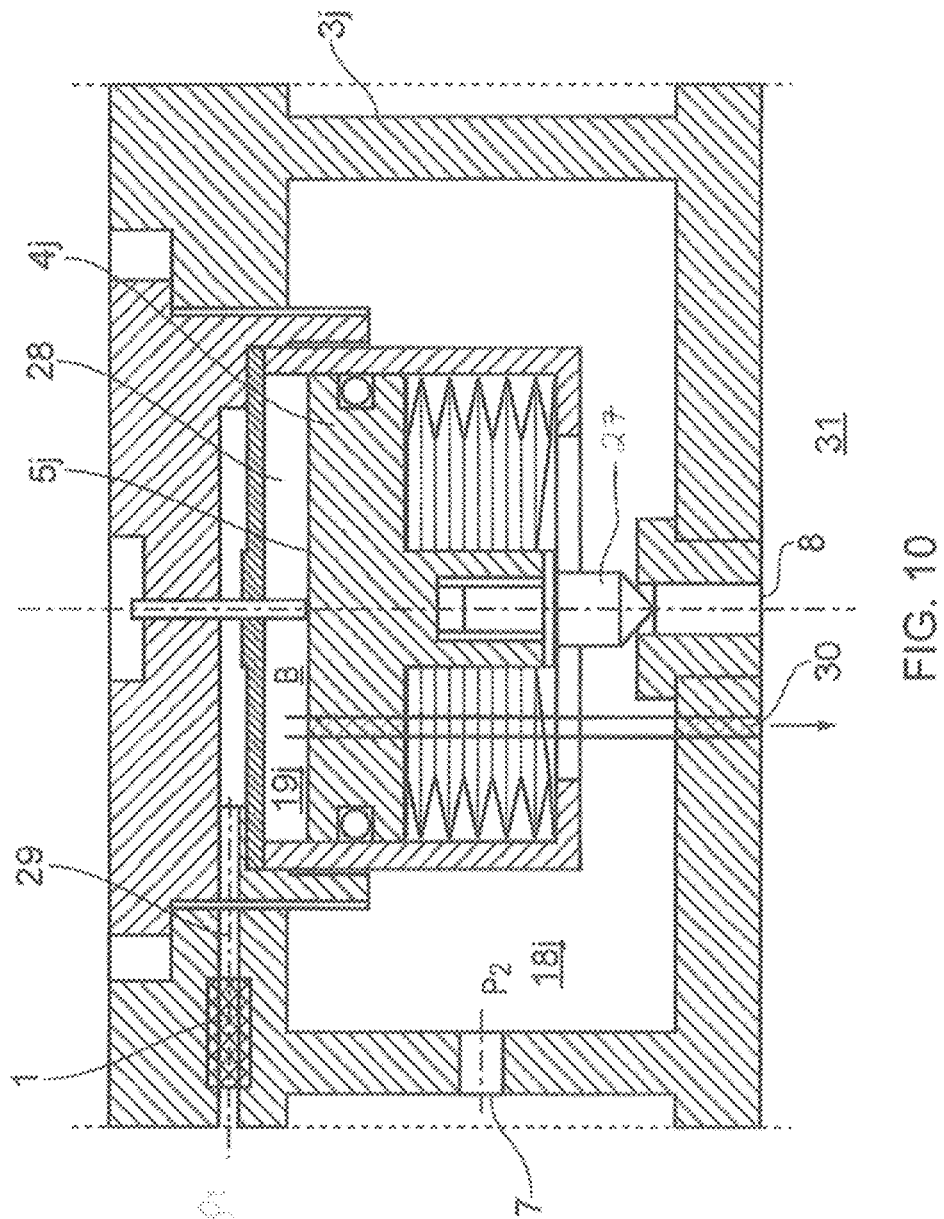
FIG. 10 illustrates a ninth embodiment of the flow control device according to the invention.

FIG. 10 illustrates an alternative embodiment as disclosed above for FIG. 9 in which the porous material 1 ensuring laminar flow during use is instead arranged within the upper conduit 29, and a channel/nozzle 30 is introduced that extends from the upper chamber 28 and into the output area 31 located downstream of the output 8. In this embodiment the secondary conduit 19j corresponds to the flow through the upper conduit 29 and the channel/nozzle 30.

In use, a minor portion f of the fluid flow F enters the housing 3j through the upper conduit 29 and the porous material 1, and further through the channel/nozzle 30 into the output area 31. At the same time a major portion $F_O$ of the fluid flow F flows through inlet 7 into the flow path 18j. The porous material 1 and the channel/nozzle 30 are thus acting as the first flow restrictor 1 and the second flow restrictor 2, respectively, while the upper chamber 28 has the same function as chamber B in FIG. 9. If fluids with sufficiently high viscosity such as oil are flowing into conduit 29, the moving member/actuator 4j is in an open position since the high flow resistance from the reactive material 1 creates a correspondingly low pressure in the upper chamber 28 (B), i.e. not sufficient to force the valve member 27 downward and thus causing a closure of the outlet 8. On the other hand, if fluids with sufficiently low viscosity such as water or gas are flowing into the upper conduit 29, the low resistance from the porous material 1 causes a correspondingly high pressure in the upper chamber 28 sufficient to provide a pressure on the surface 5j of the actuator 4j being high enough in order to move the valve member 27 downward, thus closing the output 8.

Figure 11:
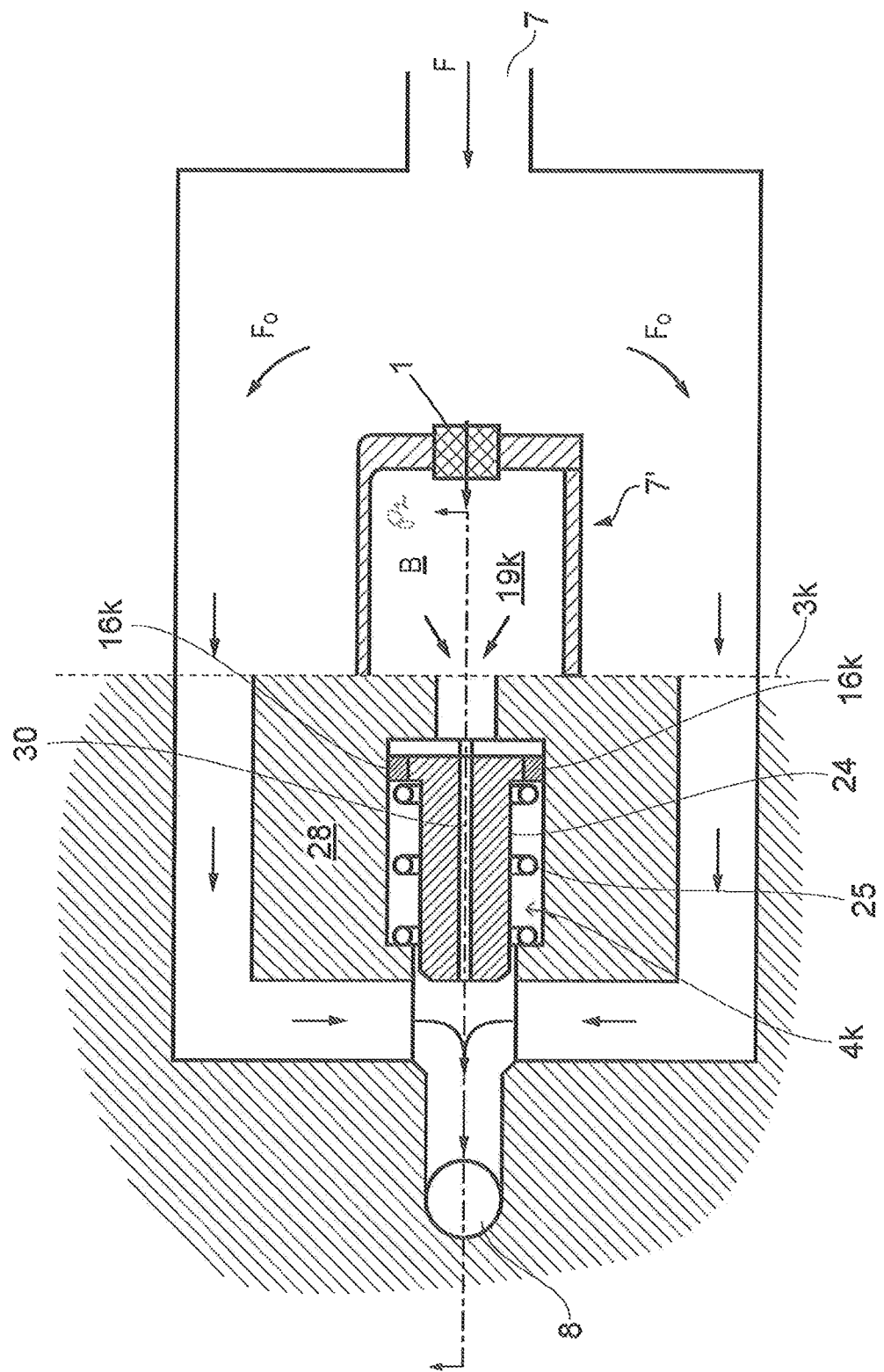
FIG. 11 illustrates a tenth embodiment of the flow control device according to the invention.

FIG. 11 illustrates a further embodiment of the inventive flow control device, wherein the housing 3k is constructed having an actuator chamber 28 in its interiors. The device further comprises an inlet 7, a secondary inlet assembly 7', an outlet 8 and a moving member/actuator 4k situated inside the actuator chamber 28, which actuator 4k comprises a piston 24 and spring 25 connected to the interior walls of the chamber 28 by appropriate seals 16k. The secondary inlet assembly 7' is arranged upstream of the actuator 4k forming in its interior a pressure chamber B having an opposite situated opening with a porous material 1. Furthermore, one or more channels/nozzles 30 are introduced extending from the chamber B and completely through or around the actuator 4k, thereby forming a second conduit 19k defined by the secondary inlet assembly 7' and the one ore more channels/nozzle 30. Except for the introduction of a porous material 1 at the secondary inlet assembly 7', thus forming a mainly laminar flow into the pressure chamber B during use, and the introduction of channel(s)/nozzle(s) 30 through or around the moving member/actuator 4k, thus forming a mainly turbulent flow during use, the structural design of the device is similar or identical to the device disclosed in the publication US 2011/0198097 A1, which hereby is included by reference.

In use, a fluid flow F enters a primary conduit 18k through a primary inlet 7. This fluid flow is then divided into a major portion $F_O$ of the flow F going around the chamber 28 and a minor portion f of the flow F entering the pressure chamber B through porous material 1. The minor portion f further into the actuator chamber 28, subsequently through the channel(s)/nozzle(s) 30 and finally through the outlet 8 together with the major portion $F_O$ of the flow F. The porous material 1 and the channel(s)/nozzle(s) 30 are thus acting as the first flow restrictor 1 and the second flow restrictor 2, respectively, and the pressure chamber B has the same function as chamber B in FIG. 10. If fluids with sufficiently high viscosity such as oil are flowing into the pressure chamber B the moving member/actuator 4k is in an open position since the high flow resistance induced by the porous material 1 causes a correspondingly low pressure ($p_2$) in the pressure chamber B, i.e. not sufficient to force the piston 24 sideways, thus resulting in a closure of the outlet 8. On the other hand, if fluids with sufficiently low viscosity such as water or gas are flowing into the pressure chamber B the lower resistance set up by the porous material 1 compared with the high viscosity fluid, and the correspondingly high resistance at the channel/nozzle 30, causes a correspondingly high pressure in the pressure chamber B sufficient to move the piston 24 sideways, thus closing the output 8.

Figure 12:
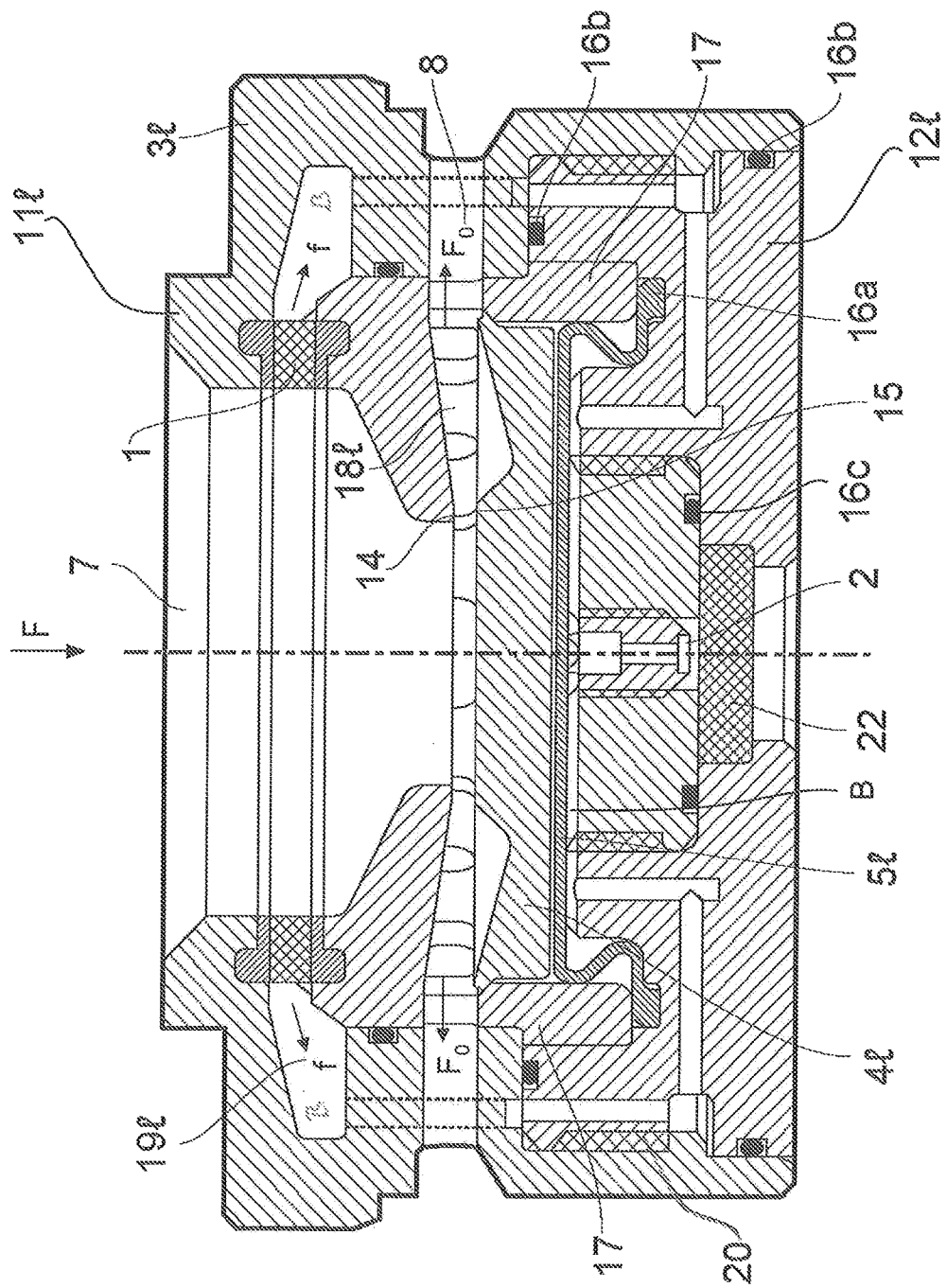
FIG. 12 illustrates a tenth embodiment of the flow control device according to the invention.

FIG. 12 illustrates a further embodiment of the inventive flow control device. The housing 3l comprises an upper part 11l (left slanted lines) and a lower part 12l (right slanted lines), the upper and lower parts 11l,12l being joined together by a threaded connection 20. Various seals 16a-c (e.g. o-rings) are illustrated in the figure to prevent fluid from leaking between the upper and lower parts 11l,12l. The housing 3l has an inlet 7 and radially arranged outlets 8, thereby setting up a primary conduit 18l for the fluid F. A member 4l is arranged for movement (in the figure: up and down) inside the housing 3l, guided by a supporting structure 17. Furthermore, a secondary conduit 19l is arranged from the inlet 7 and extending along the inside walls of the housing 3l, via a chamber B extending beneath the member 4l, that is at the side of the member 4l opposite to the primary conduit 18l, and ends in fluid communication with the outside of the housing 3l at the lower part 12l. A first fluid restrictor 1 in the form of a porous member are situated near the inlet 7 in the upper part 11l and a second fluid restrictor 2 in the form of an orifice are situated in the lower part 12l, the second fluid restrictor 2 being in fluid communication with the outside of the housing 3l. Chamber B thus extends from downstream the first fluid restrictor 1 to upsteam the second fluid restrictor 2.

In use, a fluid flow F (e.g. oil from a subterranean reservoir) enters the housing 3l through the inlet 7. Inside the housing 3l, the major portion $F_O$ of the fluid F follows the primary conduit 18l before it exits the housing 3l through the outlet(s) 8. A portion f of the fluid F flows through the porous member 1 into the secondary conduit 19l, via the chamber B beneath the member 4l and finally exits the chamber B through the orifice 2. In this embodiment of the control device, the difference in values for $p_2$ ($\Delta P_2$, see FIG. 1b), as the fluid viscosity μ changes, is serving to exert a pressure against a surface 5l on the movable member and to close the movable member 4l against the inlet 7. The sealing surfaces 14, 15 are brought together and thus substantially prevent fluid F from entering the conduit 18l.

Note that for all the above embodiments the invention is not limited to specific material such as porous member for the first or second fluid restrictors or a specific geometry such as an orifice for the other fluid restrictor. In fact, any choice of material and/or geometry is possible as long as one of the restrictors creates a mainly laminar flow and the other restrictor creates a mainly turbulent flow during use. Also, even if directional words such as up, down, below, above, sideways, etc are used with reference to the drawings, in should be understood that these words are used only for clarity and should not be interpreted as limiting the directional position of the inventive control device.

All of the embodiments of the inventive flow control device described above are autonomous in that they move (to close or open a fluid inlet) based on a changing property (e.g. viscosity μ) of the fluid. The porous member 1, the orifice 2 and the internal dimensions of the housing 3a-k may be designed to suit various applications.

Figure 13A:
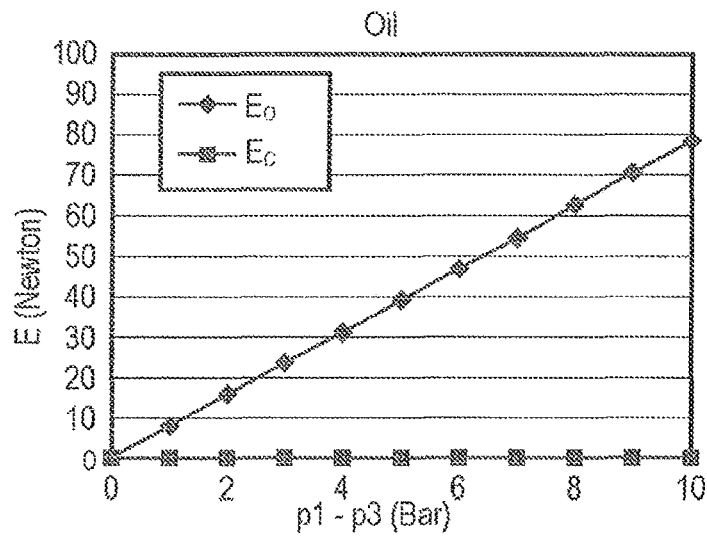
FIGS. 13a and 13b are plots illustrating closing and opening forces for oil and water, respectively, in an embodiment of the invented flow control device configured for autonomously stopping water from entering a flow of oil.
Figure 13B:
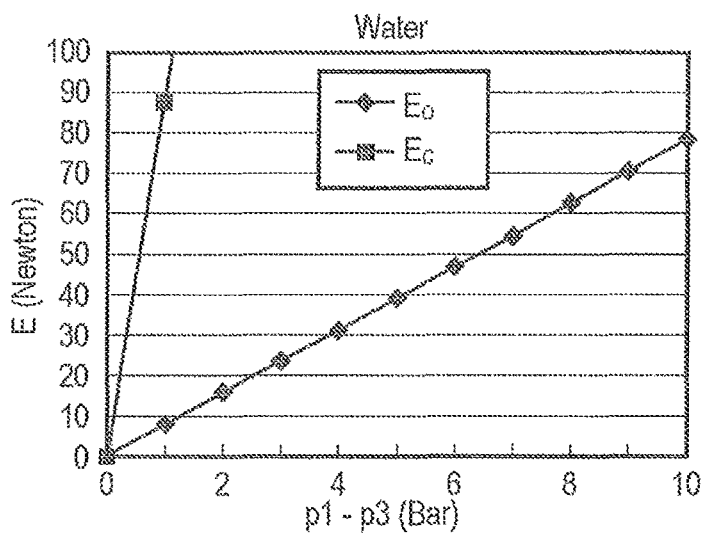

As a first example, reference is made to FIGS. 13a and 13b, showing forces (E) acting on the movable piston 4b-1 in an autonomous flow control device configured for stopping water from entering the desired oil flow phase as a function of pressure drop ($p_1$-$p_3$) across the flow control device. $E_O$ denotes the force that opens the control device, while $E_C$ denotes the force that closes the device. It is seen that, while the fluid control device is open when subjected to oil ($E_o$>$E_c$) (FIG. 13a), it closes almost instantaneously when subjected to water ($E_o$<$E_c$) (FIG. 13b).

Figure 14:
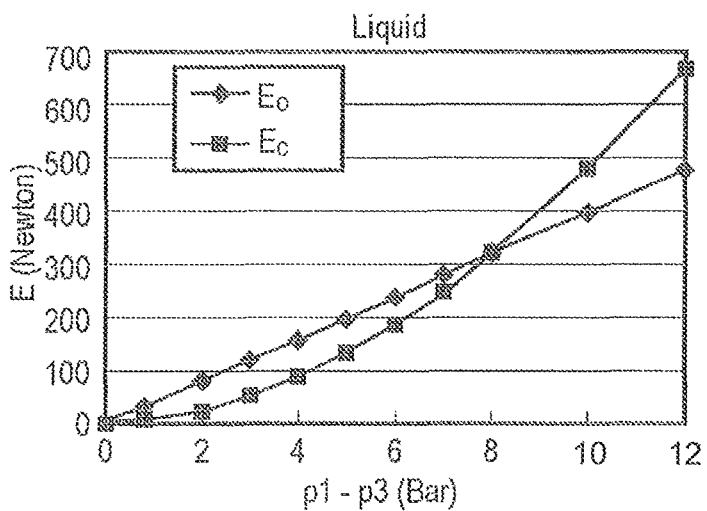
FIG. 14 is a plot illustrating closing and opening forces as a function of pressure in an embodiment of the invented flow control device configured for autonomously stopping fluid flow at a predetermined pressure difference.

For a second example, reference is made to FIG. 14, showing forces (E) acting on the movable piston in an autonomous flow control device configured for stopping any fluid inflow when the pressure differential exceeds a given limit. $E_O$ denotes the force that opens the control device, while $E_C$ denotes the force that closes the device. It is seen that the fluid control device closes at pressure drop ($p_1$-$p_3$) of approximately 8 bar.

These examples are intended to illustrate the function of the inventive inflow control device. It should be understood that the fluid flow restrictors 1,2 may be arranged and configured differently, for example essentially reversed in the flow path, if the device is intended to be used in a gas reservoir and it is desirable to prevent water from entering the production.

It should be understood that the inventive flow control device may also be arranged and configured to control and prevent the inflow of other fluids, such as $CO_2$ (which has been injected into the reservoir) and steam (injected in connection with e.g. so-called Steam-Assisted Gravity Drainage (SAGD) of heavy oil), and water in gas-producing wells.

Although the invention has been described with reference to the control of well fluids (such as oil, gas, water) from a subterranean reservoir, the skilled person will understand that the invented device and method is useful in any application where the objective is to control fluid flow based on the properties (e.g. viscosity, density) of the various fluids in the flow in order to prevent unwanted fluids from entering a fluid flow. Examples of such applications are injection wells, separation processes and steam traps.

The invention claimed is:

1. A fluid flow control device comprising:
   a) a housing arranged as an inflow port for fluids from a fluid reservoir to a production pipe in a subterranean oil well, the reservoir containing oil as well as fluids with a lower viscosity and/or density than oil, the reservoir fluids being at a pressure P1, said housing comprising:
      a primary flow path located inside the housing comprising a primary fluid inlet for receiving reservoir fluids and a primary fluid outlet for discharging reservoir fluids into the interior of the production pipe,
      a secondary flow path located in the housing comprising a secondary fluid inlet for receiving reservoir fluids and a secondary fluid outlet for discharging reservoir fluids into the interior of the production pipe,
      a valve device arranged between the primary fluid inlet and the primary fluid outlet, said valve device moveable from an open position in which the primary fluid path is open, to a closed position in which the primary fluid path is closed,
      a chamber, in which is arranged an actuator for the valve device, said chamber being in fluid communication with the secondary flow path, said chamber being exposed to a pressure P2 determined at least in part by the viscosity, density and/or velocity of the fluid flowing through the secondary flow path,
   b) at least one flow restrictor arranged in the secondary flow path, said flow restrictor or restrictors tuned to the viscosity and/or density of the fluid and arranged such that, when the fluid flowing through the secondary flow path is oil, P2 is sufficient to permit pressure P1 to force the valve into the open position, and when the fluid flowing through the secondary flow path has a viscosity and/or density lower than oil P2 is sufficient to actuate the valve to the closed position,
   whereby the fluid control device automatically and reversibly opens and closes dependent at least in part upon the viscosity and/or density of the fluid flowing therethrough.

2. A fluid control device according to claim 1, wherein the valve device is movable by the actuator to positions intermediate the open and closed positions.

3. A fluid control device according to claim 1, wherein the valve device comprises a movable piston arranged for sliding movement inside the housing.

4. A fluid control device according to claim 3, wherein the actuator is a piston surface.

5. A fluid control device according to claim 1, wherein the at least one flow restrictor comprises a constriction.

6. A fluid control device according to claim 1, wherein the at least one flow restrictor comprises a porous material.

7. A fluid control device according to claim 1, wherein the fluid responsible for pressure P2 that actuates the valve to a closed position is water or gas.

8. A fluid control device according to one of the preceding claims, wherein the secondary flow path comprises two flow restrictors, each imparting a pressure change based on a different fluid property, and wherein pressure P2 is a result of a pressure difference arising between the two restrictors, dependent upon the viscosity and/or density of the fluid.

* * * * *

UNITED STATES PATENT AND TRADEMARK OFFICE
CERTIFICATE OF CORRECTION

PATENT NO. : 10,260,312 B2
APPLICATION NO. : 15/587419
DATED : April 16, 2019
INVENTOR(S) : Vidar Mathiesen, Bjørnar Werswick and Haavard Aakre Page 1 of 1

It is certified that error appears in the above-identified patent and that said Letters Patent is hereby corrected as shown below:

On the Title Page

Item (71) should read as follows: "InflowControl AS"

Signed and Sealed this
Thirteenth Day of May, 2025

Coke Morgan Stewart
*Acting Director of the United States Patent and Trademark Office*